Oct. 23, 1928.
R. M. SCHLEGEL
SWIVEL TYPE LUBRICATING DEVICE
Filed April 26, 1927    2 Sheets-Sheet 1
1,688,941
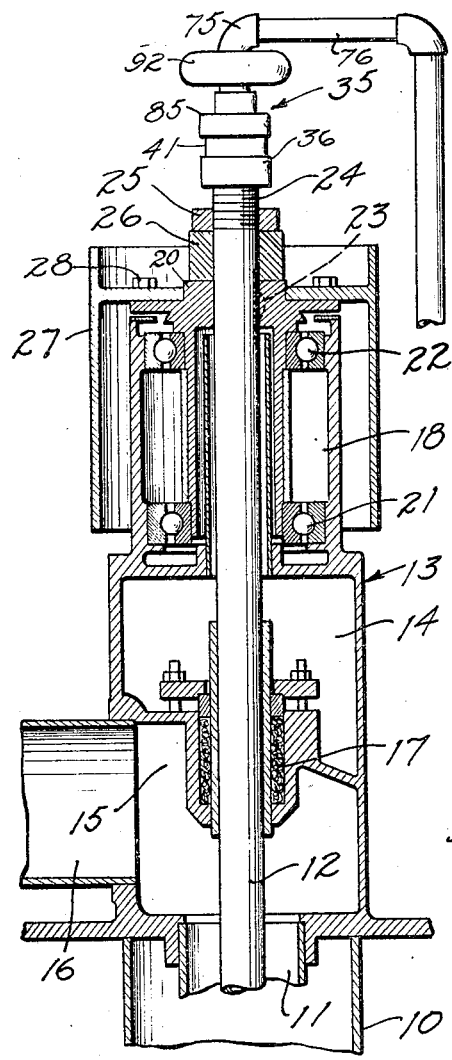
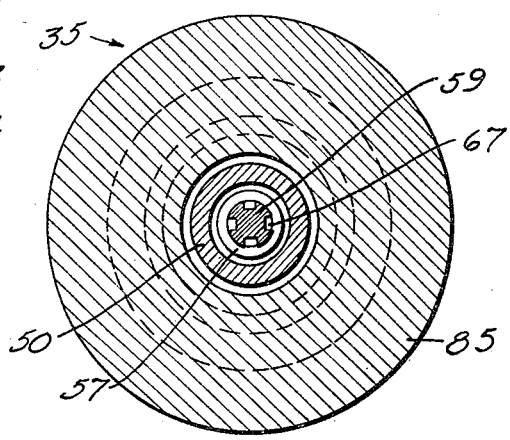

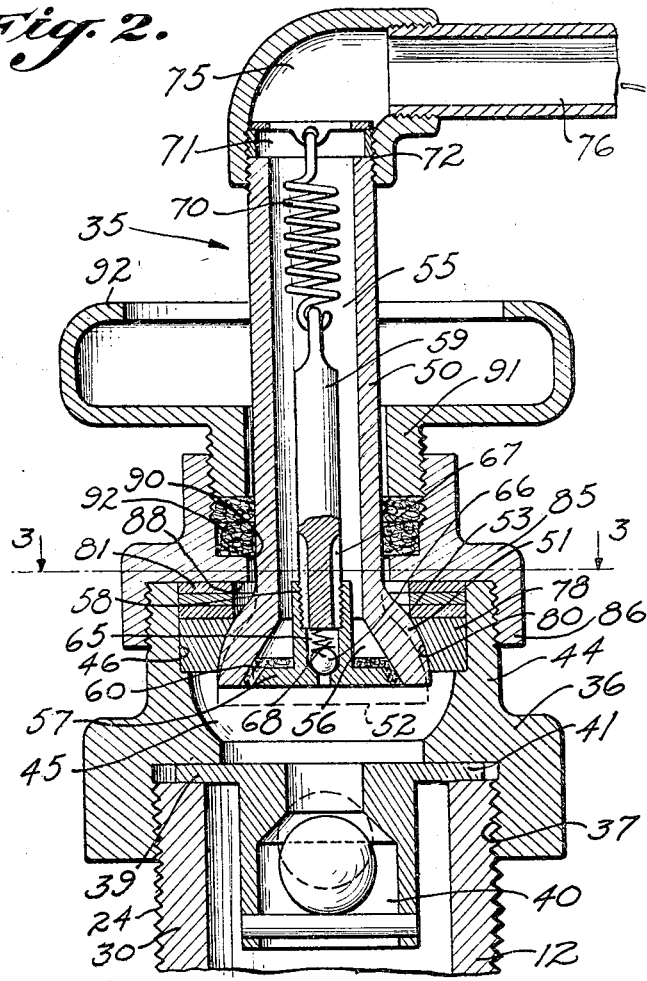

Patented Oct. 23, 1928.

1,688,941

UNITED STATES PATENT OFFICE.

RONALD M. SCHLEGEL, OF LOS ANGELES, CALIFORNIA, ASSIGNOR TO FRANK J. KIMBALL COMPANY, OF LOS ANGELES, CALIFORNIA, A CORPORATION OF CALIFORNIA.

SWIVEL-TYPE LUBRICATING DEVICE.

Application filed April 26, 1927. Serial No. 186,605.

My invention relates to injecting devices and more particularly to a device for injecting a fluid into the interior of a shaft while the latter is rotating.

Certain types of deep well rotary pumps are placed at the bottom of a well and are operated by a rotating line shaft which extends throughout the length of the well. This line shaft is supported and driven at its upper end by a drive head which may provide a pulley adapted to be driven by a belt or an electric motor directly connected to the line shaft.

Bearings are provided in the well casing at certain intervals to keep the line shaft properly aligned throughout its length and to prevent whipping. Lubrication of these line shaft bearings is accomplished in various ways, one method being to make the line shaft hollow and force lubricant downward into the upper end of the shaft, an aperture through the wall of the shaft being provided at each bearing to allow the escape of sufficient lubricant to supply that bearing.

This method of supplying lubricant to the line bearings is the most effective yet devised but has not come into general use due to the necessity of shutting down the pump in order to inject lubricant into the upper end of the line shaft. The frequency with which it is necessary to inject lubricant makes it a prohibitive annoyance and waste of time when the pump owner is obliged to shut down the pump each time this is done.

It is an object of my invention to provide a lubricant injecting device by which lubricant may be injected into a line shaft while this is rotating.

Another object of my invention is to provide a lubricant injecting device which may be attached to the end of any tubular line shaft as these are at present made.

It is a further object of my invention to provide a lubricant injecting device which will form a tight seal with the line shaft to which it is connected during an injection of lubricant but which will cause a negligible amount of friction when said device is not actively injecting lubricant into said line shaft.

A yet further object of my invention is to provide a lubricant injecting device which will not spill said lubricant so as to cause this to be flung from said device due to its rotation.

Yet another object of my invention is to provide a lubricant injecting device which may be disassembled without the spilling of lubricant contained in said device.

Further objects and advantages will be made manifest in the following description and in the accompanying drawings, in which Fig. 1 is a vertical sectional view of a pump head having a hollow line shaft and showing a preferred embodiment of the lubricant injector of my invention attached to the line shaft.

Fig. 2 is an enlarged vertical sectional view of the lubricant injector shown in Fig. 1.

Fig. 3 is a section taken on line 3—3 of Fig. 2.

Referring specifically to the drawings, 10 indicates a well having a pump tubing 11 provided therein. A rotary pump (not shown) is disposed in the bottom of the well, is connected to the bottom end of the tubing 11, and is operated by a hollow line shaft 12 which extends downward from the top of the well through the tubing 11 to the pump at the bottom end of the tubing.

A pump head 13 is provided at the top of the well and includes a body casting 14 which has a pumped-fluid vestibule 15 which connects both with the upper end of the pump tubing 11 and a discharge pipe 16. A packing gland 17 adapted to receive the line shaft 12 is provided in a wall of the vestibule 15. The line shaft projects upward above the stuffing box 17 and extends concentrically through a bearing standard 18 provided upon the body casting 14. A hollow mandrel 20 is disposed within the standard 18 and is rotatably supported in this standard by a thrust bearing 21 and radial bearing 22. The line shaft 12 is provided with a suitable key-way which receives a key 23 provided in the mandrel 20 so as to be rotatably locked to the mandrel, this key-way being of sufficient length to permit vertical adjustment of the line shaft 12 relative to the mandrel 20. The upper end of the line shaft 12 is provided with external threads 24 which are adapted to receive a nut 25 which rests against a collar 26 placed about the line shaft and resting upon an upper face of the mandrel 20. The line shaft 12 is supported by the nut 25 and the collar 26 upon the mandrel 20, the weight of the line shaft being transmitted from the mandrel to the pump head casting 14 through the thrust bearing 21. The vertical position of the line shaft may be adjusted by turning the nut 25.

A pulley wheel 27 is secured to the mandrel 20 in any desirable manner, as by the cap screws 28. The pulley wheel 27 is adapted to be rotated by a belt connected with a prime mover for the purpose of rotating the line shaft 12 to operate the pump disposed at the bottom of the well 10.

The hollow line shaft 12 is held in axial alignment within the pump tubing 11 by the provision of suitable bearings at intervals throughout the length of the tubing. It is essential that these bearings be lubricated, and a very convenient method of conducting lubricant to these bearings is by forming openings in the wall 30 of the line shaft 12 within the zone of each of these bearings and passing a lubricant downward through the line shaft so that this will pass through these openings and lubricate the line shaft bearings. As previously mentioned, it has been the practice to stop the rotation of the line shaft 12 whenever lubricant is thus injected into the upper end thereof. The line shaft rotates at a fairly high rate and a considerable amount of lubricant is consumed by the large number of line shaft bearings which are necessary in a deep well. Thus the necessity for stopping the rotation of the line shaft in order to supply lubricant thereto has caused considerable inconvenience in the operation of the pump.

I have therefore devised a lubricant injector 35 which is adapted to be applied to the upper end of the line shaft 12 and to inject lubricant into the line shaft while this is rotating. The lubricant injector 35 includes an annular base member 36 which has a threaded opening 37 adapted to be screwed upon the upper end of the line shaft 12. When the member 36 is thus screwed upon the line shaft 12, a radial flange 39 of a ball check valve 40 is gripped between a radial face 41 of the member 36 and the upper end of the line shaft 12 so that the ball check valve 40 closes the upper end of the line shaft against movement of fluid upward therefrom. The member 36 has a neck 44 rising upward therefrom which is externally threaded at its upper end and has a lubricant receiving chamber 45 in its interior which communicates with the check valve 40. The chamber 45 is enlarged at its upper end by a cylindrical counterbore 46.

An injector nozzle 50 is disposed in axial alignment with the member 36 and the line shaft 12 so that an enlarged head 51 of the injector 50 is disposed downward within the chamber 45. The injector 50 is adapted to have an upper position in which it is shown in full lines in Fig. 2, and a lower position which is indicated by the dotted lines 52. The outer surface 53 of the head 51 is a surface of rotation and is preferably semi-spherical in shape. The nozzle 50 is tubular in form and has a passageway 55 extending throughout its length connecting its lower end with a poppet-valve chamber 56. The valve chamber 56 is adapted to receive a poppet-valve head 57 which has a neck 58 and which is provided with a threaded opening into which a valve stem 59 is screwed. The poppet-valve head 57 may be provided with a packing face 60 which insures tight contact between the head 57 and the surface of the chamber 56. The head 57 has a by-pass 65 which extends upward into communication with the threaded opening 58 and is restricted at its lower end so that it will retain a ball 66. The stem 59 is provided with grooves 67 which communicate between the nozzle passage 55 and the by-pass 65 so that fluid may pass upward through the by-pass 65 around the ball 66 and through the groove 67 into the nozzle passage 55. A small compression spring 68 is disposed between the lower end of the stem 59 and the ball 66 so as to hold this ball down in a manner to close the by-pass 65 against passage of fluid downward therethrough. The poppet-valve 57 is yieldably held up in a manner to close the lower end of the passage 55 against a flow of fluid downward therefrom by a tension spring 70, one end of which hooks into a suitable aperture in the upper end of the stem 59 and the opposite end hooks over a bar 71, the ends of which rest in suitable recesses formed diametrically in the upper end of the nozzle 50.

The upper end of the nozzle 50 is provided with external threads 72. An elbow 75 is adapted to be screwed upon the threads 72 and connect the injector passage 55 with a lubricant supply pipe 76. The lubricant supply pipe 76 is connected with a lubricant pumping means which is adapted to supply a lubricant thereto under high pressure, and it is also connected to said lubricant pumping means in a yieldable manner, as by a flexible tube (not shown) to permit movement of the nozzle 50 between its upper and lower positions.

Before the elbow 75 is screwed upon the nozzle 50 in the assembly of the injector 35 the nozzle is positioned as shown in Fig. 2 and an annular seat member 78 is placed over the nozzle 50, the member 78 being of such diameter as to form a neat sliding fit within the counterbore 46. The opening within the annular member 78 is shaped to provide a seat 80 which is complementary to the face 53 of the nozzle head 51. When the member 78 has thus been disposed in the lower portion of the counterbore 46, a plurality of anti-friction washers 81 are disposed in the upper portion of the counterbore 46. The washers 81 are of the same outer diameter as the member 78 and are highly polished on their surfaces so as to slide rotatably one upon the other. The upper face of the uppermost washer 81 is disposed a few thousandths of an inch below the upper end of the neck 44.

An injector body cap 85 has an internally threaded annular flange 86 which is adapted to be screwed downward upon the upper end of the neck 44. The cap 85 has a radial face 88 which rests against the upper end of the neck 44 when the cap is screwed downward thereon, this face retaining the washers 81 and the member 78 in the counterbore 46 so that they may freely rotate therein. A central opening 90 is provided in the cap 85, this cap being counterbored and threaded at its upper end to receive a gland 91 which compresses a body of packing 92 so that this forms a resilient guide for the nozzle 50. The gland 91 has a bowl 92 formed upon its upper end which is adapted to retain any lubricant which might exude upward past the packing 92 so that this lubricant will not be flung outward due to rotation of the gland 91 with the line shaft 12. When the parts just described have been assembled about the nozzle 50, as shown in Fig. 2, the elbow 75 is screwed on to the upper end of the nozzle 50 so as to connect this with the lubricant pressure-supply means in a manner previously described.

The operation of my lubricant injector is as follows:

The hollow interior of the line shaft 12 is normally filled with lubricant which may be either oil or grease and, at established intervals during the operation of the pump, the level of lubricant inside of the shaft 12 falls to such an extent as to make it necessary to inject a fresh supply of lubricant in the upper end of the shaft. When the line shaft 12 is rotating and no lubricant is being supplied through the nozzle 50, the nozzle is in its lower position 52. When it is desired to inject lubricant into the upper end of the line shaft, the lubricant supply means is set in operation so as to force lubricant through the pipe 76 and elbow 75 downward through the nozzle passage 55. This lubricant, being under fairly high pressure causes the tension spring 70 to be lengthened to permit the lubricant to pass downward around the poppet-valve 57 into the lubricant receiving chamber 45. Here the pressure of the lubricant forces the nozzle 50 upward into engagement with the seat 80 of the seat member 78. Rotation of the seat member 78 with the member 36 is thus halted, and upward pressure of the nozzle 50, due to the pressure of the lubricant in the chamber 45, is transmitted to the cap 85 through the polished anti-friction bearing washers 81. The washers 81 form a practically fluid-tight contact with each other so that a lubricant-tight sealing is thus established between the nozzle 50 and the cap 85. The upper end of the chamber 45 thus being sealed to prevent the lubricant discharged downward from the nozzle 50 from passing upward between the nozzle and the cap 85, the lubricant flows downward through the check valve 40 into the upper end of the line shaft 12. When the line shaft 12 has been filled with lubricant, an indicator on the lubricant pump will reveal this condition and operation of the pump will be halted, thus relieving the pressure placed upon the lubricant in the pipe 76 and the nozzle 50.

Expansion of the lubricant in the line shaft 12 will cause the ball check valve 40 to close. Thus a slight backward flow of lubricant into the chamber 45 from the line shaft 12 will result, and the ball 66 will compress the spring 68 to permit passage of lubricant through the by-pass 65 into the passage 55 of the nozzle 50 to relieve the pressure of lubricant in the chamber 45. The relief of this pressure will permit the nozzle 50 to drop into its downward position 52 in which the nozzle will remain out of contact with the member 78 during the subsequent operation of the pump and until a fresh supply of lubricant in the line shaft 12 is required.

It will thus be seen that the injector nozzle of my invention is adapted to inject lubricant into a line shaft while it is rotating, and, while forming a tight connection with said line shaft during the injection of lubricant, will automatically disengage itself from parts rotating with the line shaft during the interval between injections of lubricant.

I claim as my invention:

1. A device for injecting lubricant into a rotating hollow shaft, said device comprising: a body adapted to rotate with said shaft and having a chamber communicating with the interior of said shaft, a seat being formed upon said body in said chamber; a nozzle projecting into said chamber and having a face adapted to make a tight contact with said seat or be disposed away from said contact; and means for forcing lubricant through said nozzle into said chamber in a manner to move said nozzle so that said face contacts said seat.

2. A device for injecting lubricant into a rotating hollow shaft, said device comprising: a body adapted to rotate with said shaft and having a chamber communicating with the interior of said shaft, a seat being formed upon said body in said chamber; a check valve substantially preventing a flow of lubricant from the interior of said shaft into said chamber; a nozzle projecting into said chamber and having a face adapted to make a tight contact with said seat or be disposed away from said contact; and means for forcing lubricant through said nozzle into said chamber in a manner to move said nozzle so that said face contacts said seat.

3. A device for injecting lubricant into a rotating hollow shaft, said device comprising: a body adapted to rotate with said shaft and having a chamber communicating with the interior of said shaft, a seat being formed upon said body in said chamber; a nozzle projecting into said chamber and having a face adapted to make a tight contact with said seat or be disposed away from said contact; means for forcing lubricant through said nozzle into said chamber in a manner to move said nozzle so that said face contacts said seat; and a guide between said body and said nozzle.

4. A device for injecting lubricant into a rotating hollow shaft, said device comprising: a body adapted to rotate with said shaft and having a chamber communicating with the interior of said shaft, a seat being formed upon said body in said chamber; a check valve substantially preventing a flow of lubricant from the interior of said shaft into said chamber; a nozzle projecting into said chamber and having a face adapted to make a tight contact with said seat or be disposed away from said contact; means for forcing lubricant through said nozzle into said chamber in a manner to move said nozzle so that said face contacts said seat; and a guide between said body and said nozzle.

5. A device for injecting lubricant into a rotating hollow shaft, said device comprising: a body adapted to rotate with said shaft and having a chamber communicating with the interior of said shaft; a seat member rotatably disposed in said chamber, a seat being formed on said member; a nozzle projecting into said chamber and having a face adapted to make a tight contact with said seat or be disposed away from said contact; and means for forcing lubricant through said nozzle into said chamber in a manner to move said nozzle so that said face contacts said seat.

6. A device for injecting lubricant into a rotating hollow shaft, said device comprising: a body adapted to rotate with said shaft and having a chamber communicating with the interior of said shaft; a seat member rotatably disposed in said chamber, a seat being formed on said member; a check valve substantially preventing a flow of lubricant from the interior of said shaft into said chamber; a nozzle projecting into said chamber and having a face adapted to make a tight contact with said seat or be disposed away from said contact; and means for forcing lubricant through said nozzle into said chamber in a manner to move said nozzle so that said face contacts said seat.

7. A device for injecting lubricant into a rotating hollow shaft, said device comprising: a body adapted to rotate with said shaft and having a chamber communicating with the interior of said shaft; a seat member rotatably disposed in said chamber, a seat being formed on said member; a nozzle projecting into said chamber and having a face adapted to make a tight contact with said seat or be disposed away from said contact; means for forcing lubricant through said nozzle into said chamber in a manner to move said nozzle so that said face contacts said seat; and a guide between said body and said nozzle.

8. A device for injecting lubricant into a rotating hollow shaft, said device comprising: a body adapted to rotate with said shaft and having a chamber communicating with the interior of said shaft; a seat member rotatably disposed in said chamber, a seat being formed on said member; a check valve substantially preventing a flow of lubricant from the interior of said shaft into said chamber; a nozzle projecting into said chamber and having a face adapted to make a tight contact with said seat or be disposed away from said contact; means for forcing lubricant through said nozzle into said chamber in a manner to move said nozzle so that said face contacts said seat; and a packing means between said body and said nozzle.

9. A device for injecting lubricant into a rotating hollow shaft, said device comprising: a body adapted to rotate with said shaft and having a chamber communicating with the interior of said shaft, a seat being formed upon said body in said chamber; a nozzle projecting into said chamber and having a face adapted to make a tight contact with said seat or be disposed away from said contact; means for forcing lubricant through said nozzle into said chamber in a manner to move said nozzle so that said face contacts said seat; and a valve disposed in the mouth of said nozzle preventing flow of lubricant therefrom except under a given pressure.

10. A device for injecting lubricant into a rotating hollow shaft, said device comprising: a body adapted to rotate with said shaft and having a chamber communicating with the interior of said shaft, a seat being formed upon said body in said chamber; a check valve substantially preventing a flow of lubricant from the interior of said shaft into said chamber; a nozzle projecting into said chamber and having a face adapted to make a tight contact with said seat or be disposed away from said contact; means for forcing lubricant through said nozzle into said chamber in a manner to move said nozzle so that said face contacts said seat; and a valve disposed in the mouth of said nozzle preventing flow of lubricant therefrom except under a given pressure.

11. A device for injecting lubricant into a rotating hollow shaft, said device comprising: a body adapted to rotate with said shaft and having a chamber communicating with the interior of said shaft, a seat being formed upon said body in said chamber; a nozzle projecting into said chamber and having a face adapted to make a tight contact with said seat or be disposed away from said contact; means for forcing lubricant through said nozzle into said chamber in a manner to move said nozzle so that said face contacts said seat; a valve disposed in the mouth of said nozzle preventing flow of lubricant therefrom except under a given pressure; and a by-pass valve permitting a return flow of lubricant from said chamber into said nozzle.

12. A device for injecting lubricant into a rotating hollow shaft, said device comprising: a body adapted to rotate with said shaft and having a chamber communicating with the interior of said shaft, a seat being formed upon said body in said chamber; a check valve substantially preventing a flow of lubricant from the interior of said shaft into said chamber; a nozzle projecting into said chamber and having a face adapted to make a tight contact with said seat or be disposed away from said contact; means for forcing lubricant through said nozzle into said chamber in a manner to move said nozzle so that said face contacts said seat; a valve disposed in the mouth of said nozzle preventing flow of lubricant therefrom except under a given pressure; and a by-pass valve permitting a return flow of lubricant from said chamber into said nozzle.

13. A device for injecting lubricant into a rotating hollow shaft, said device comprising: a body adapted to rotate with said shaft and having a chamber communicating with the interior of said shaft, a seat being formed upon said body in said chamber; a nozzle projecting into said chamber and having a face adapted to make a tight contact with said seat or be disposed away from said contact; means for forcing lubricant through said nozzle into said chamber in a manner to move said nozzle so that said face contacts said seat; a guide means between said body and said nozzle; and a cup provided upon said guide means to catch and retain lubricant escaping therefrom against its being flung from said body due to its rotation with said shaft.

In testimony whereof, I have hereunto set my hand at Los Angeles, California, this 18th day of April, 1927.

RONALD M. SCHLEGEL.